US008702427B1

(12) United States Patent
Prestwood

(10) Patent No.: US 8,702,427 B1
(45) Date of Patent: Apr. 22, 2014

(54) METHOD OF TEACHING USING CLOTHING

(71) Applicant: Nellie Prestwood, Beverly Hills, CA (US)

(72) Inventor: Nellie Prestwood, Beverly Hills, CA (US)

(*) Notice: Subject to any disclaimer, the term of this patent is extended or adjusted under 35 U.S.C. 154(b) by 0 days.

(21) Appl. No.: 13/874,148

(22) Filed: Apr. 30, 2013

Related U.S. Application Data

(60) Provisional application No. 61/687,627, filed on Apr. 30, 2012.

(51) Int. Cl.
*G09B 1/08* (2006.01)
(52) U.S. Cl.
USPC .............. 434/99; 434/159; 434/168; 434/429
(58) Field of Classification Search
USPC .................................... 434/99, 159, 168, 429
See application file for complete search history.

(56) References Cited

U.S. PATENT DOCUMENTS

| | | | | | |
|---|---|---|---|---|---|
| 3,724,101 | A | * | 4/1973 | Slezak | 434/170 |
| 4,253,197 | A | * | 3/1981 | Posta | 2/69 |
| 4,353,700 | A | * | 10/1982 | Volakakis | 434/168 |
| 4,636,172 | A | * | 1/1987 | Fredericks | 434/159 |
| 4,820,164 | A | * | 4/1989 | Kemper | 434/238 |
| 5,468,152 | A | * | 11/1995 | Lenart | 434/429 |
| 5,813,153 | A | * | 9/1998 | Maglio | 40/1.6 |
| 5,957,692 | A | * | 9/1999 | McCracken et al. | 434/159 |
| 6,142,785 | A | * | 11/2000 | Williams | 434/205 |
| 6,782,554 | B1 | * | 8/2004 | Froehlich | 2/69 |
| 7,063,535 | B2 | * | 6/2006 | Stamm et al. | 434/236 |
| 7,296,999 | B2 | * | 11/2007 | Webber | 434/168 |
| 7,914,290 | B2 | * | 3/2011 | Yoon | 434/260 |
| 2002/0108162 | A1 | * | 8/2002 | Bolds-Leftridge | 2/49.1 |
| 2003/0099920 | A1 | * | 5/2003 | Edwards et al. | 434/159 |
| 2006/0105304 | A1 | * | 5/2006 | Webber | 434/168 |
| 2007/0275356 | A1 | * | 11/2007 | Murphy | 434/99 |
| 2008/0189830 | A1 | * | 8/2008 | Egglesfield | 2/244 |
| 2009/0178180 | A1 | * | 7/2009 | Harris | 2/244 |
| 2009/0260123 | A1 | * | 10/2009 | Swift | 2/69 |
| 2010/0058511 | A1 | * | 3/2010 | Lee | 2/69 |
| 2010/0095571 | A1 | * | 4/2010 | James | 40/586 |

* cited by examiner

*Primary Examiner* — Kathleen Mosser
*Assistant Examiner* — James Hull

(57) ABSTRACT

The present invention features a method of teaching a child the letters of the alphabet, the numbers, the shapes, and the primary colors by a caregiver. The method features obtaining a teachable clothing system featuring a teachable clothing article of clothing having a character attached thereon. The character is located in view of a wearer when worn. The character is reachable by a hand of the wearer when worn. The system features a teachable clothing game book. The method features outfitting the teachable clothing article of clothing on a child, verbalizing a character name, verbalizing a character color, pointing to an object in an occupied room having the same character color as the character, and reading the teachable clothing game book to the child at a child's end of the day and playing a game described in the teachable clothing game book with the child.

2 Claims, 8 Drawing Sheets

METHOD OF TEACHING USING CLOTHING

CROSS REFERENCE

This application claims priority to U.S. patent application No. 61/687,627, filed Apr. 30, 2012, the specification(s) of which is/are incorporated herein in their entirety by reference.

FIELD OF THE INVENTION

The present invention relates to methods of teaching a child the letters of the alphabet using the clothing worn by the child.

BACKGROUND OF THE INVENTION

There are many effective ways of learning, but it is commonly held that the most effective ways involve using a plurality of receptors. For example, visual, auditory, and kinesthetic types of learning each offer effective ways of learning, but when used in combination, the effectiveness greatly increases. The present invention features a method of teaching a child the letters of the alphabet, the numbers, the shapes, and the primary colors by a caregiver.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a method of teaching a child the letters of the alphabet, the numbers, the shapes, and the primary colors by a caregiver. In some embodiments, the method comprises obtaining a teachable clothing system comprising a teachable clothing article of clothing having a character located thereon via an attachment means. In some embodiments, the character is located on a location in view of a wearer when worn. In some embodiments, the character is located on a location reachable by a hand of the wearer when worn. In some embodiments, the system comprises a teachable clothing game book.

In some embodiments, the method comprises outfitting the teachable clothing article of clothing on a child. In some embodiments, the method comprises verbalizing a character name. In some embodiments, the method comprises verbalizing a character color. In some embodiments, the method comprises pointing to an object in an occupied room having the same character color as the character. In some embodiments, the method comprises reading the teachable clothing game book to the child at a child's end of the day and playing a game described in the teachable clothing game book with the child.

DESCRIPTION OF PREFERRED EMBODIMENTS

Figure 1:
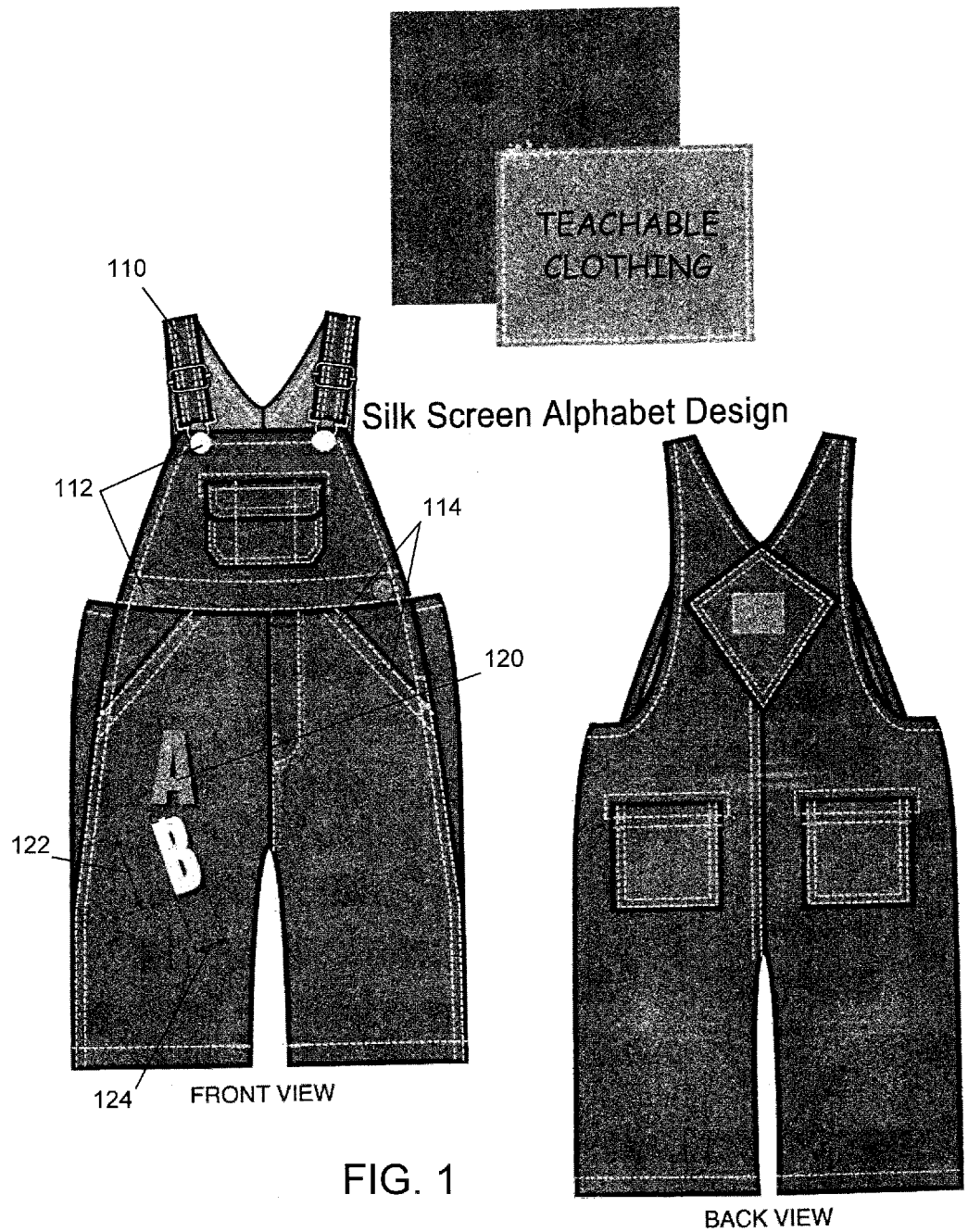
FIG. 1 shows a teachable clothing article of clothing of the present invention.
Figure 2:
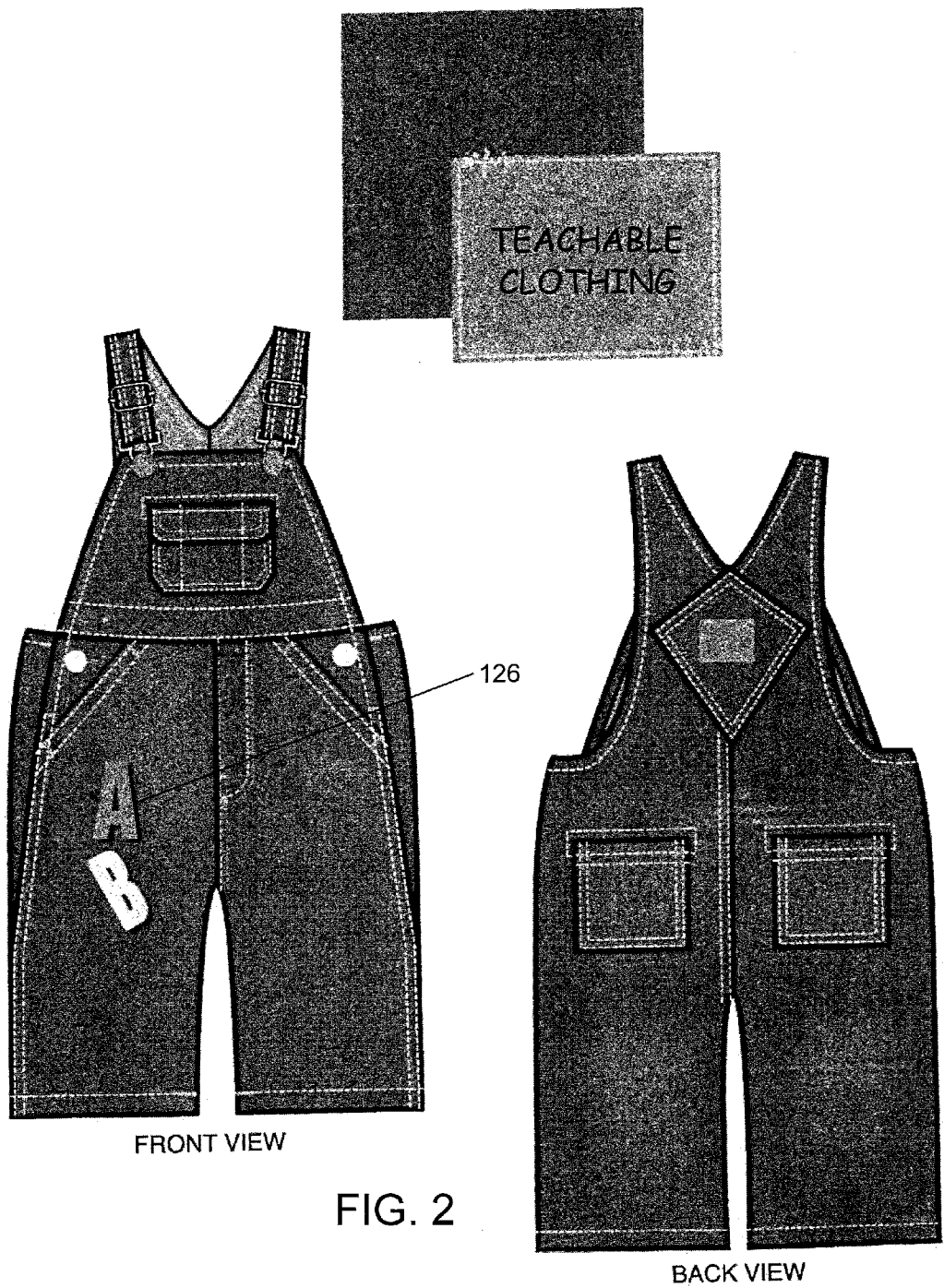
FIG. 2 shows a teachable clothing article of clothing of the present invention.
Figure 3:
FIG. 3 shows the present invention.
Figure 4:
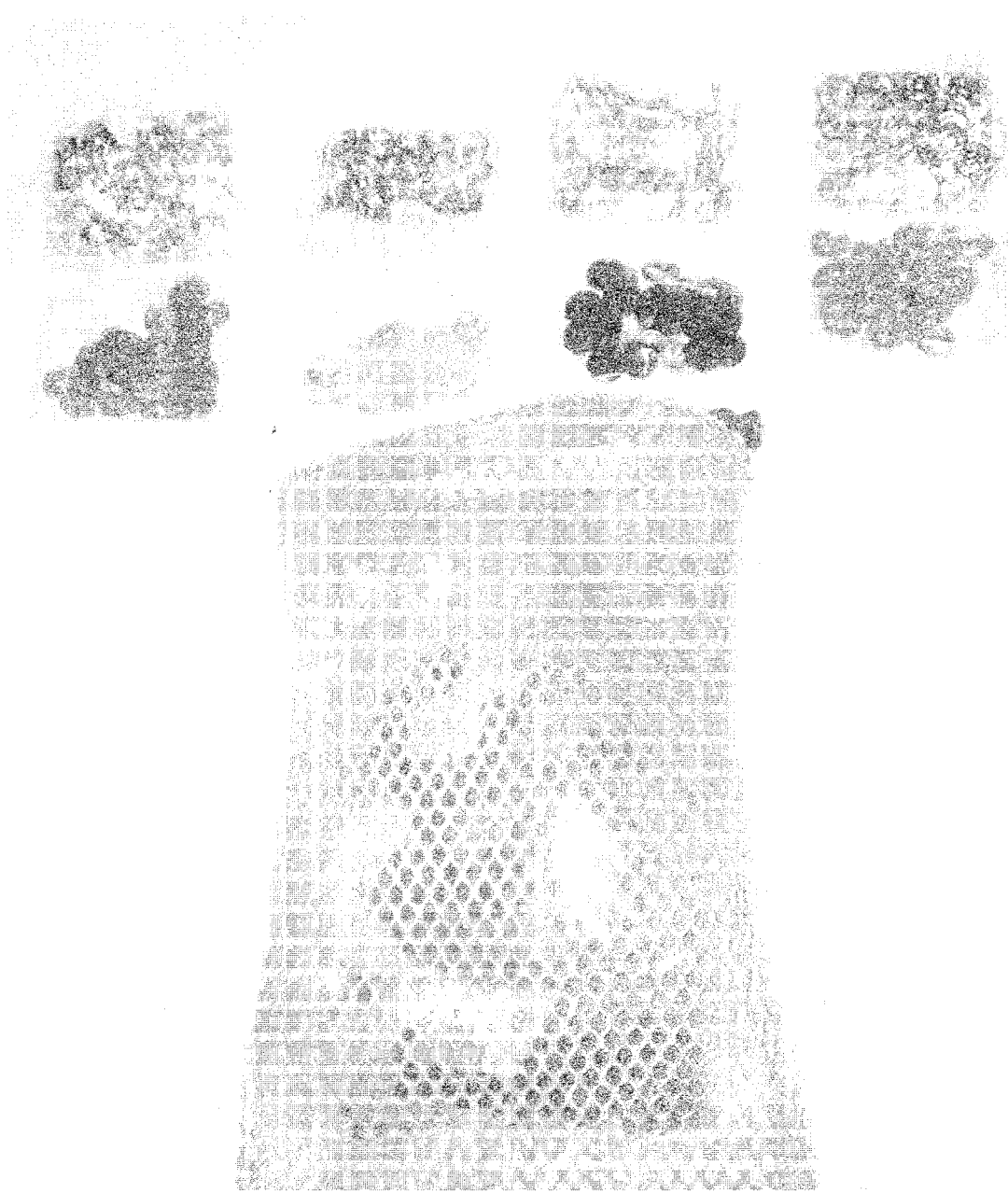
FIG. 4 shows a bag, characters, and hardware of the present invention.
Figure 5:
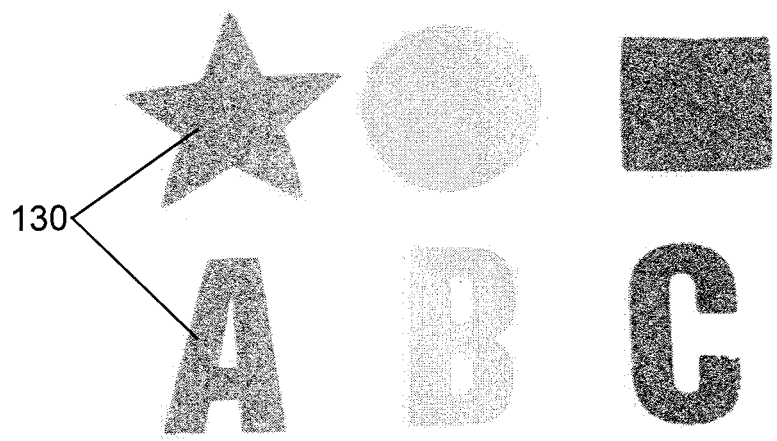
FIG. 5 shows characters of the present invention.
Figure 6:
FIG. 6 shows a teachable clothing article of clothing of the present invention.
Figure 7:
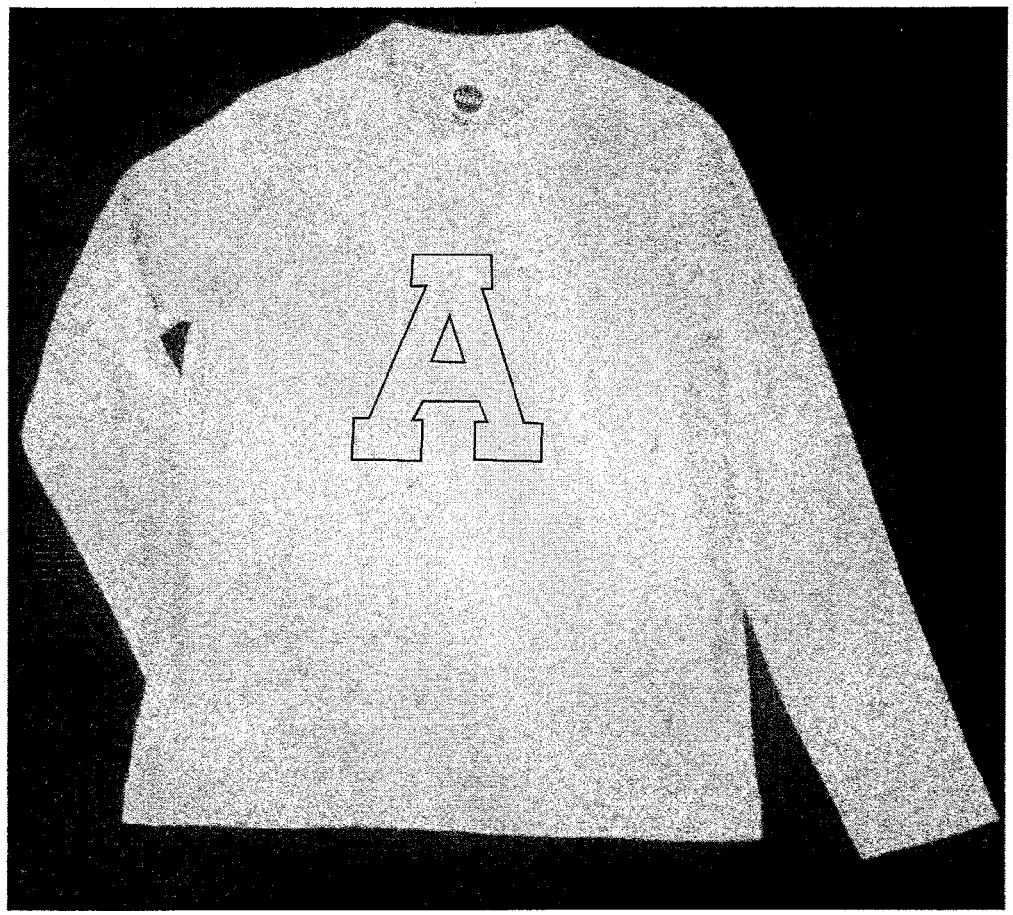
FIG. 7 shows a teachable clothing article of clothing of the present invention.
Figure 8:
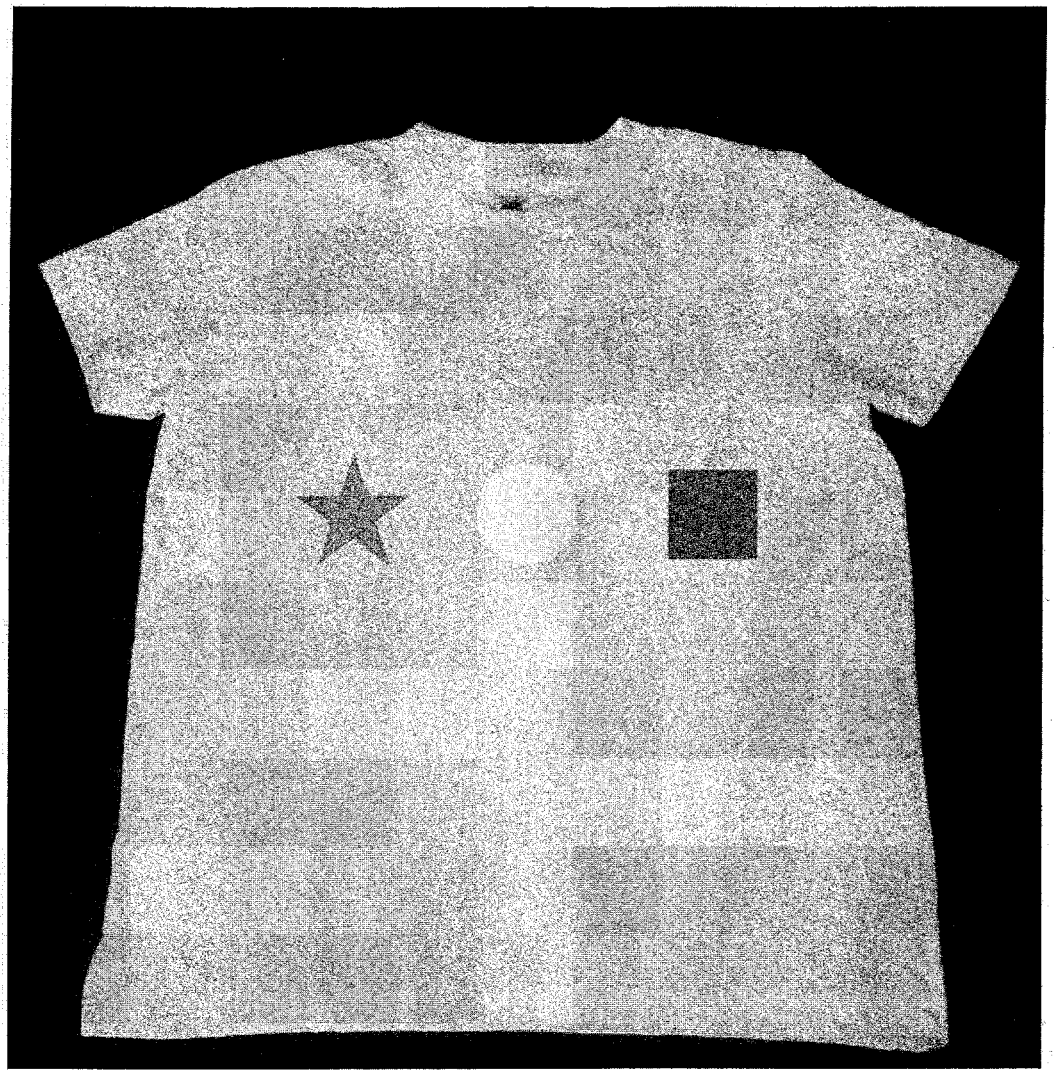
FIG. 8 shows a teachable clothing article of clothing of the present invention.

Following is a list of elements corresponding to a particular element referred to herein:

100 Teachable clothing system
110 Teachable clothing article of clothing
112 Hardware
114 Stitching
120 Character
122 Character height
124 Character width
126 Character thickness
130 Attachment means
140 Teachable clothing game book Referring now to FIG. 1-8, the present invention features a method of teaching a child the letters of the alphabet, the numbers, the shapes, and the primary colors by a caregiver.

In some embodiments, the method comprises obtaining a teachable clothing system (100) comprising a teachable clothing article of clothing (110) comprising a character (120) located thereon via an attachment means (130). In some embodiments, the character (120) comprises a character name. In some embodiments, the character (120) is located on a location in view of a wearer when worn. In some embodiments, the character (120) is located on a location reachable by a hand of the wearer when worn. In some embodiments, the character (120) comprises a character height (122), a character width (124), a character thickness (126), a character color, and a character texture. In some embodiments, the teachable clothing article of clothing (110) comprises colored hardware (112) and stitching (114) located thereon. In some embodiments, the system (100) comprises a teachable clothing game book (140).

In some embodiments, the method comprises outfitting the teachable clothing article of clothing (110) on a child. In some embodiments, the method comprises verbalizing the character name of the character (120) immediately after outfitting the teachable clothing article of clothing (110) on a child. In some embodiments, the method comprises verbalizing the character color of the character (120) immediately after verbalizing the character name. In some embodiments, the method comprises pointing to an object in an occupied room having the same character color as the character (120). In some embodiments, the method comprises verbalizing the character color of the character (120) followed by a name of the object immediately after verbalizing the character color of the character (120). In some embodiments, the method comprises verbalizing the character name and character color of the character (120) upon noticing the hand of the child placed on the character (120) or alternately at least three times throughout the day. In some embodiments, the method comprises reading the teachable clothing game book (140) to the child at a child's end of the day and playing a game described in the teachable clothing game book (140) with the child. In some embodiments, the method comprises removing the teachable clothing article of clothing (110) from the child. In some embodiments, the method comprises verbalizing the character name of the character (120) immediately after removing the teachable clothing article of clothing (110)

from the child. In some embodiments, the method comprises verbalizing the character color of the character (120) immediately after verbalizing the character name of the character (120). In some embodiments, the method comprises pointing to the object in the occupied room having the same character color as the character (120). In some embodiments, the method comprises verbalizing the character color of the character (120) followed by the name of the object immediately after verbalizing the character color of the character.

In some embodiments, a teachable clothing system (100) for teaching a child the letters of the alphabet, the numbers, the shapes, and the primary colors comprises a teachable clothing article of clothing (110) comprising a character (120) located thereon via an attachment means (130). In some embodiments, the teachable clothing article of clothing (110) comprising one character (120) located thereon via the attachment means (130). In some embodiments, the teachable clothing article of clothing (110) comprising two characters (120) located thereon via the attachment means (130). In some embodiments, the teachable clothing article of clothing (110) comprising three characters (120) located thereon via the attachment means (130).

In some embodiments, the character (120) comprises a character name, for example, ay, bee, one, two, circle, or square. In some embodiments, the character (120) is located on a location in view of a wearer when worn. In some embodiments, the character (120) is located on a location reachable by a hand of the wearer when worn. In some embodiments, the location is on a front surface of the teachable clothing article of clothing (110).

In some embodiments, the character (120) comprises a character height (122). In some embodiments, the character height (122) is between 0 and 1 inch. In some embodiments, the character height (122) is between 1 and 2 inches. In some embodiments, the character height (122) is between 2 and 3 inches. In some embodiments, the character height (122) is between 3 and 4 inches. In some embodiments, the character height (122) is greater than 4 inches.

In some embodiments, the character (120) comprises a character width (124). In some embodiments, the character width (124) is between 0 and 1 inch. In some embodiments, the character width (124) is between 1 and 2 inches. In some embodiments, the character width (124) is between 2 and 3 inches. In some embodiments, the character width (124) is between 3 and 4 inches. In some embodiments, the character width (124) is greater than 4 inches.

In some embodiments, the character (120) comprises a character thickness (126). In some embodiments, the character thickness (126) is between 0 and 1/8 inch. In some embodiments, the character thickness (126) is between 1/8 and 1/4 inch. In some embodiments, the character thickness (126) is between 1/4 inch and 3/8 inch. In some embodiments, the character thickness (126) is greater than 3/8 inch.

In some embodiments, the character (120) comprises a character color. In some embodiments, the character (120) comprises a character texture, for example, smooth, fuzzy, ridged, or scratchy. In some embodiments, the teachable clothing article of clothing (110) comprises colored hardware (112) and stitching (114) located thereon. In some embodiments, the hardware (112) is a snap, a buckle, a button, or a rivet.

In some embodiments, the system comprises a teachable clothing game book (140). In some embodiment the teachable clothing game book comprises learning activities and games described therein.

In some embodiments, the attachment means (130) is a hook and loop system. In some embodiments, the character (120) is constructed from loop material from a hook and loop system. In some embodiments, the character (120) is constructed from loop material from a hook and loop system on both sides. In some embodiments, the attaching means comprises a hook component from a hook and loop system disposed on the teachable clothing article of clothing (110). In some embodiments, the hook component comprises a geometric shape, for example, a star, a circle, or a square. In some embodiments, the hook component comprises the character color, for example, red, yellow, or blue.

In some embodiments, the attachment means (130) is an adhesive. In some embodiments, the attachment means (130) is embroidery or sewing thread. In some embodiments, the attachment means (130) is the colored solution used for silk screening. In some embodiments, the character (120) is formed from the same material as the attachment means (130), for example the silk screening process. In some embodiments, the attachment means (130) is permanent. In some embodiments, the attachment means (130) is temporary, In some embodiments, the character (120) is constructed from embroidery thread. In some embodiments, the character (120) is constructed from cloth. In some embodiments, the character (120) is constructed from silk screen solution.

In some embodiments, the character (120) is selected from a group consisting of the following: A, B, C, D, E, F, G, H, I, J, K, L, M, N, O, P, Q, R, S, T, U, V, W, X, Y, Z, 0, 1, 2, 3, 4, 5, 6, 7, 8, and 9. In some embodiments, the character (120) is a geometric shape.

In some embodiments, the character color is selected from a group consisting of the following: red, blue, green, yellow, orange, violet, brown, black, gray, and white.

In some embodiments, a color of the colored hardware (112) and stitching (114) is selected from a group consisting of the following: red, blue, green, yellow, orange, violet, brown, black, gray, and white. In some embodiments, the colored hardware (112) and stitching (114) each comprise different colors, for example, one rivet may be green and another rivet may be red.

In some embodiments, the system (100) comprises a bag for storing the characters (120). In some embodiments, the bag is mesh. In some embodiments, the bag comprises the character color.

In some embodiments, the teachable clothing article of clothing (110) is disposed in a package of three. In some embodiments, the package of three teachable clothing article of clothing (110) features different characters (120) located on each one.

In some embodiments, the teachable clothing article of clothing (110) comprises a shirt having three characters (120). In some embodiments, the three characters (120) are a red star, a yellow circle, and a blue square. In some embodiments, this teachable clothing article of clothing (110) is known as an "every body is a star" teaching tee.

In some embodiments, the teachable clothing article of clothing (110) comprises overalls, pants, a shirt, a jacket, pajamas, or any of many other types of clothing.

In some embodiments, this innovative Twenty-First Century method of teaching will provide parents and caregivers with a platform to combine getting dressed and teaching as an intuitive encounter. Teachable clothing utilizes auditory, visual and kinesthetic skills by using the provided alphabets, numbers, and geometric figures (made of loop (hook and loop) that will attach to shapes (made of hook (hook and loop) which are affixed to various garments including but not limited to t-shirts, polo shirts, denims, overalls, rompers, bibs, pants, skirts, sleepers, and caps. There will be various design options for the garments including silk screening and embroidery. The hook Velcro that will be embroidery around the edges of the Stars, Circles and Squares onto our t-shirts and other garments to secure the mounting of the loop Velcro Alphabets, Numbers and Geometric Shapes. The included literature will provide information and instruction for usage, which includes manipulation and recognition requirements of the provided figures.

In The Alphabet Game Book that comes with the attachable garments, silkscreen and embroidery complete are all that is required to teach the alphabets, numbers and geometric shapes. Have no concerns regarding the disengagement of the alphabets or numbers from the garment, because the purpose of the disengaging of the alphabets is to keep the learning process active throughout the day. The daily morning routine starts with getting dressed. In the morning a Toddler can be taught his or her Alphabet and Colors while being dressed by a parent, grandparent, or caregiver. We designed t-shirts with color alphabets and overalls and denims that also include colored snaps and rivets. The hardware on the overalls and denims will be in the colors of Red, Yellow, Blue, and Green, which open the opportunity to teach colors with dressing in the morning and undressing at bedtime. It's an effective way of reinforcing the alphabets and colors with the simple tools provided.

This methodology of teaching has no limit for it can be used day and night. It is not limited to the English language since every language has its own alphabet, and it is essential that children be made aware of the different languages of the world.

In some embodiments, the teachable clothing game book (140) comprises instruction with regards to the following: "Scaffolding"*—Similar to the way scaffolding provides structure for a building until it can stand on its own, the "scaffolding" teaching technique involves an adult guiding the child's learning process until the child can complete the task on his/her own. The adult guides only as necessary, catering to the child's Zone of Proximal Development (ZPD) *, or the child's set of abilities to do something as independently as possible. Guiding the child's learning process does NOT mean the adult is doing anything FOR the child. Instead, the adult should ask open-ended questions and give clues for the child to figure the task out on his/her own. *Terms coined by developmental theorist Lev Vygotsky (1896-1934).

Praise and Critique—In order for a child to develop a healthy self-confidence and motivation to learn, adults need to understand how to praise and critique appropriately. Praising and/or critiquing too much or too little can lead to frustration, disappointment, or lack of self-confidence and motivation. Generally, the best form of praise involves a simple narration of what the child is doing or has done: "You matched up the letters!" or "You're sticking the letter 'A' onto your shirg". This form of praise is far more effective than saying "good job" or giving stickers and other rewards because it lets the child know you are acknowledging what they are doing, and notice the effort they are putting into it, which allows them to enjoy the process without getting wrapped up in the end result, Remember, children are bound to make mistakes, just as adults are. They need to know that it's okay to make a mistake because if they don't, it is likely that they will begin to fear making mistakes and will not be as confident to try things out on their own. Therefore, Instead of saying things like, "No, that's a 'B', not an 'A'", just ask them, "Oh, why do you think that's a 'B'?" or "Yes, 'A' is a letter, but this letter is called 'B'." When children are learning letters, they usually generalize what they already know (ex. "A") and begin at first to call all letters "A", which actually indicates that they understand what letters look like, and that's the first step! Once they understand the concept of letters—what they look like, that they have names, and that they tell us to make a sound—they are then ready to begin learning the individual differences and names of each of the letters. Learning is, indeed, a process! Allow them to take their time and enjoy.

Balance structured learning time with free exploration—Children learn through play. When they play, they are processing and practicing all the things they have learned and are learning in life. In addition to doing structured activities with your child, let him/her play with the materials in whatever way he/she wants to! This will allow them the space they need to process and practice, and ultimately internalize what they are learning. You never know, your child just might come up with games you never would have thought of yourself!

Here are some games you can play with your child! Feel free to make up your own as well, and to let your child take the lead!

Name Game—The best way to start learning letters is to relate them to your child's name! Children love hearing and seeing their own name, so it is an easy way for them to become motivated to learn about the letters that make up their name. At the beginning stages, have your child play different matching games to match up the letters in his/her name.

Label Your Home!—As your child becomes more advanced in his/her letter learning process, you can begin to have them use letters to label things around your home, such as the couch, refrigerator, bed, or table. This can also turn into a fun hide-and-seek type game, where your child can try to find all the letters around your home.

Name Your Family—When children are learning letters, they often associate letters with the names of their closest family and friends. They might say things like, "A is for Alex!" or "D is for Dad!" You can turn this into a game by having everyone wear a hook and loop shirt while your child sticks the appropriate letter onto each person. This game can become more and more advanced as your child begins to understand how multiple letters come together to form a word or a name.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale. Including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A method of teaching a child the letters of the alphabet, the numbers, the shapes, and the primary colors by a caregiver, wherein the method consists of:
 a. obtaining a teachable clothing system (100) consisting of:
  i. a teachable clothing article of clothing (110) consisting of a character (120) disposed thereon via a temporary attachment means (130), including a hook and loop system or an adhesive, wherein the character (120) consists of a character name, wherein the character (120) is disposed on a location in view of a wearer when worn, wherein the character (120) is disposed on a location reachable by a hand of the wearer when worn, wherein the character (120) consists of a character height (122), a character width (124), a character thickness (126), a character color, and a character texture, wherein the teachable clothing article of clothing (110) consists of colored hardware (112) and stitching (114) disposed thereon, and
  ii. a teachable clothing game book (140);
 b. outfitting the teachable clothing article of clothing (110) onto a child;
 c. verbalizing the character name of the character (120) immediately after outfitting the teachable clothing article of clothing (110) onto a child;
 d. verbalizing the character color of the character (120) immediately after verbalizing the character name;
 e. pointing to an object in an occupied room having the same character color as the character (120), thereby facilitating the learning of the character (120) and the character color by such association;
 f. verbalizing the character color of the character (120) followed by a name of the object immediately after verbalizing the character color of the character (120);
 g. verbalizing the character name and character color of the character (120) when the child places the hand on the character (120);
 h. reading the teachable clothing game book (140) to the child at a child's end of the day and playing a game described in the teachable clothing game book (140) with the child;
 i. removing the teachable clothing article of clothing (110) from the child;
 j. verbalizing the character name of the character (120) immediately after removing the teachable clothing article of clothing (110) from the child;
 k. verbalizing the character color of the character (120) immediately after verbalizing the character name of the character (120);
 l. pointing to the object in the occupied room having the same character color as the character (120), thereby facilitating the learning of the character (120) and the character color by such association;
 m. verbalizing the character color of the character (120) followed by the name of the object immediately after verbalizing the character color of the character;
 wherein the steps (a) through (m) above are sequentially in the order of (a) through (m).

2. A method of teaching a child the letters of the alphabet, the numbers, the shapes, and the primary colors by a caregiver, wherein the method consists of:
 a. obtaining a teachable clothing system (100) consisting of:
  i. a teachable clothing article of clothing (110) consisting of a character (120) disposed thereon via a temporary attachment means (130), including a hook and loop system or an adhesive, wherein the character (120) consists of a character name, wherein the character (120) is disposed on a location in view of a wearer when worn, wherein the character (120) is disposed on a location reachable by a hand of the wearer when worn, wherein the character (120) consists of a character height (122), a character width (124), a character thickness (126), a character color, and a character texture, wherein the teachable clothing article of clothing (110) consists of colored hardware (112) and stitching (114) disposed thereon, and
  ii. a teachable clothing game book (140);
 b. outfitting the teachable clothing article of clothing (110) onto a child;
 c. verbalizing the character name of the character (120) immediately after outfitting the teachable clothing article of clothing (110) onto a child;
 d. verbalizing the character color of the character (120) immediately after verbalizing the character name;
 e. pointing to an object in an occupied room having the same character color as the character (120), thereby facilitating the learning of the character (120) and the character color by such association;
 f. verbalizing the character color of the character (120) followed by a name of the object immediately after verbalizing the character color of the character (120);
 g. verbalizing the character name and character color of the character (120) when the child places the hand on the character (120);
 h. reading the teachable clothing game book (140) to the child at a child's end of the day and playing a game described in the teachable clothing game book (140) with the child;
 i. removing the teachable clothing article of clothing (110) from the child;
 j. verbalizing the character name of the character (120) immediately after removing the teachable clothing article of clothing (110) from the child;
 k. verbalizing the character color of the character (120) immediately after verbalizing the character name of the character (120);
 l. pointing to the object in the occupied room having the same character color as the character (120), thereby facilitating the learning of the character (120) and the character color by such association;
 m. verbalizing the character color of the character (120) followed by the name of the object immediately after verbalizing the character color of the character.

* * * * *